July 18, 1967 T. SEKSE 3,332,065

FIRST CHARACTER DETECTOR FOR PAPER TAPE READER

Filed Sept. 13, 1962

INVENTOR
TORKJELL SEKSE

BY David [signature]

ATTORNEY

United States Patent Office 3,332,065

Patented July 18, 1967

3,332,065

FIRST CHARACTER DETECTOR FOR PAPER TAPE READER

Torkjell Sekse, Norristown, Pa., assignor to Sperry Rand Corporation, New York, N.Y., a corporation of Delaware Filed Sept. 13, 1962, Ser. No. 223,477
17 Claims. (Cl. 340—172.5)

This invention relates to paper tape control devices and more particularly a device for accurately determining whether a first character read in a tape read operation is the last line of data from a previous read operation or the first line of data for the operation now being performed.

With the wide scale use of electronic data processing devices it has become necessary to provide large masses of input and output information for use in the particular process being performed. This data could be stored in a main storage unit, known as the memory, within the data processing device itself. However, this increases the size of the data processing equipment as well as increases technical problems of selection and maintenance. A simpler and more desirable approach would be the use of a relatively small internal storage device or memory capable of storing only the information which is to be used in the immediate processing steps or calculations and provide a larger external bulk storage to provide additional information which might be required in succeeding steps or processes. One of the most convenient arrangements of this second type is the use of a magnetic or punched paper tape to provide the desired external storage. This tape may be prepared by a variety of peripheral equipments not necessarily located at the place where the main data processing device or calculator is found. The tape after such preparation may then be sent to the location of the main processor or calculator for processing.

In many of the external tape storage systems employed at present, information is prepared in block form upon the tape, i.e, a given number of computer words or units of information are stored within a given region of the tape. The amount of information or number of computer words which are stored within a given block is not varied from one block to the next but is always of a standard size. The individual blocks of data or information are separated by blank areas containing no information. This blank area is sometimes followed by a short area giving an address, that is, the location with respect to the starting position of the tape, of the particular block of data which follows. After the address (if present) and/or blank area the block of data containing the information is reached. The use of such a form of tape presentation of information is wasteful of tape and does not necessarily meet the requirements of a particular computing or data processing step in progress. For example, it may only be necessary to employ 30 computer words in a particular operation whereas the block of data in the standardized form may have 120 or 720 computer words. This necessitates the use of fillers to fill out the standardized block form. Further the space required between individual blocks of information can contain no information other than the address if this is to prevent the possible confusion of data contained in one block with that in the following or preceding block.

In order to overcome the difficulties stated with regard to tape systems now in use, it is desirable to provide a system which permits handling data in variable block lengths, that is, as many computer words as are actually required for a particular process step. It is also very desirable to provide a system which is able to determine the points along the tape, where the tape has been started or stopped without the necessity of large blank areas or address areas. Such a system of tape preparation and handling would permit flexibility of the tape storage media. Although this approach would satisfy and overcome many of the disadvantages specified in those types of tape systems now in use, it would introduce technical problems of its own special nature. For example, if a block length of random or varied length were desired, it would be desirable to provide counting equipment which could accurately be set to indicate the number of words or characters to be transferred and to accurately count such words or characters as they are transferred from the tape to the main memory of the computer. Further it would be quite necessary to be able to accurately determine if the information being read is valid or not. The problem of keeping track of the number of words which are to be transferred in any particular operation can be simply solved. However, the problem of accurately determining the validity of the initial character of a particular group of computer words or data which is to be transferred presents a more difficult problem. If it were possible to stop tape precisely at a desired point, e.g. at the final character of a particular word which is to be transferred or the first character of the following group, then at the start of the next read operation of a particular group of characters or words it could be assured that the first character of the desired group would be the first read thus giving a valid initial character. However, due to the high speed at which the tape is moved and the relatively slow and inaccurate braking systems which are presently in use, it is not possible to accurately stop the tape at a precise, desired point at all times. Further, due to certain mechanical limitations such as wear, dirt, changes in tolerances due to temperature and environment, initial adjustments of the device are not able to provide reliable braking during continued use. These problems are intensified by the characteristics of the tape which is of small cross section, and relatively flexible. Thus the tape may be subject to deformation or stretching during movement. As the tape is advanced tension is placed upon the tape causing an initial stretch, in the direction of movement of the tape. This tension is relieved when the drive is removed and the tape is brought to rest, causing a return of the tape or a slight contraction of the tape in a direction opposite to the movement of said tape, which is not necessarily equal to the original stretch. This contraction or movement in the reverse direction causes additional positioning errors with respect to the tape.

Hence, when the tape is stopped, the strong possibilities exist that the tape will stop beyond the desired point if sufficient tension still is applied to the tape, or it remains permanently stretched, or the tape may stop before the desired point due to the movement of the tape as it relaxes from the tension of movement.

The particular problems set forth above with respect to tape handling and reading devices are overcome by employment of a device constructed in accordance with the invention herein. As briefly stated, the invention consists of employing a device which can accurately determine the validity of a particular line or character of data without resort to additional marker character patterns on the tape. Validity as employed herein is used to distinguish the desired condition wherein the first line of data of the data read operation presently ordered by the computer from the undesired condition where the last line of data from a previous read operation is reread. In the embodiment set out below, the data to be transferred is arranged in rows across the width of a tape. These rows consist of a plurality of data holes, one possible hole for each position in the code to be employed, that is, if a standard Western Union telegraph type code is employed, five possible characters or five data holes are required for each line. However, the number of holes may be varied in accordance with the code selected. Also found in each data line is a sprocket hole used to provide necessary timing and synchronization pulses. These holes are arranged so as to place the centers of the sprocket hole and data holes for any one character upon the same center line. The sprocket hole is significantly smaller in diameter than the data holes which are also contained in its associated data line. The sprocket hole may be centrally placed along the width of the tape or may be arranged to occupy any convenient position. In that the sprocket hole is smaller in diameter than the data holes there is a portion of the data hole which occupies the same physical relationship along the length of the tape as does the sprocket hole. Further, there are portions of the data hole which lie in physical location before and after the area covered by the sprocket hole. Individual lines of data holes are separated from each other by an area known as the gap which is approximately equal to the length of tape moved in 1000 microseconds. When the tape is stopped in a particular location the circuitry of the invention will determine with respect to the sprocket, data and gap positions where the tape has actually been stopped. For example, means are provided which can determine whether the tape has been stopped in the gap, at the sprocket location or in that portion of the data hole which lies outside of the relative area covered by the sprocket hole. From this determination it is then evident whether or not the tape has been stopped at such a position as will permit reading only of correct data lines during the next data read operations.

Also, the invention includes circuitry to determine and accurately count the number of characters or data lines which are to be transferred in any particular operational step. In the tape handling system in which the instant invention is employed the first character to be transferred in a new data transfer will always be the character immediately following the last character of the block of information previously transferred. In other words it is not permissible or possible to address any other location upon the tape. In this manner the requirement for block addresses and spacing between the individual blocks of data is removed.

The invention may also be extended to cover the use of magnetic tape, drum or other record surfaces merely by providing magnetically recorded signals corresponding to the data and sprocket positions as set forth with respect to the punched tape. Appropriate magnetic reading heads would be provided instead of the sensing heads provided for the punched tape. The same basic approach would be employed.

It is an object of this invention to provide an improved tape handling system.

It is another object of this invention to provide a novel form of detector for detecting the first character to be transferred in a paper or magnetic tape read operation.

It is another object of this invention to provide an apparatus which can accurately determine the point at which a paper or magnetic tape has been stopped as a result of the completion of a former tape reading operation.

It is yet another object of this invention to provide a device which may accurately transfer from a punched paper or magnetic tape to a central memory location a number of computer words or characters which may be varied as desired.

It is still another object of this invention to provide a control device wherein data read from a tape may be directed to or prevented from reaching an internal memory location depending upon the correctness of the tape location at the time of reading.

It is yet another object of this invention to provide a device for determining the point at which a paper or magnetic tape has been stopped as a result of the completion of a former reading operation which does not require constant readjustment and which may operate within a wide range of mechanical and climatic factors.

Other objects and features of the invention will be pointed out in the following description and claims and illustrated in the accompanying drawings, which disclose, by way of invention, the principle of the invention, and the best mode which has been contemplated for carrying it out.

In the drawings.

Similar elements are given similar reference characters in all of the drawings.

Figures 1, 2:
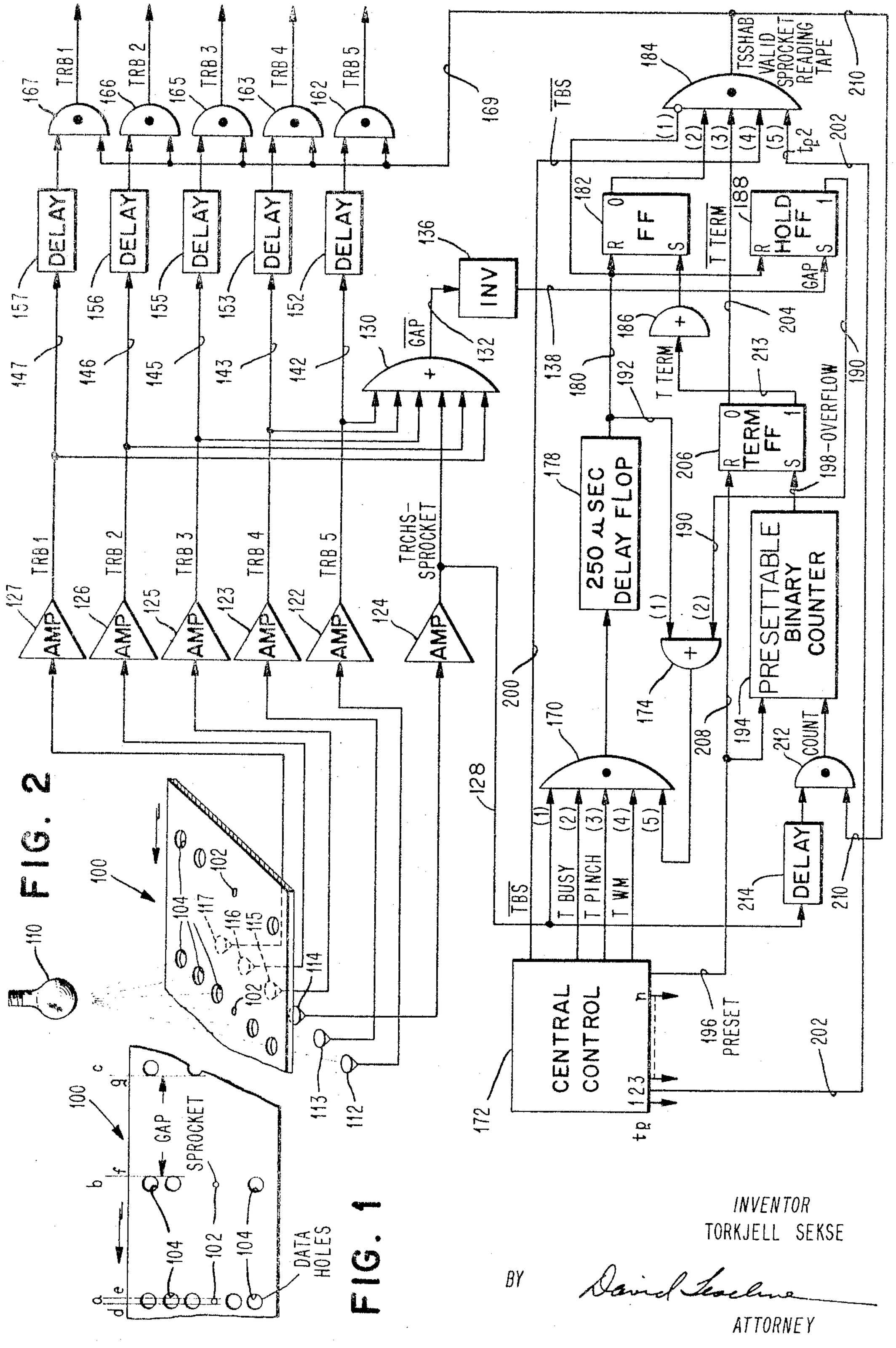
FIGURE 1 illustrates a typical portion of punched paper tape employed with this invention.
FIGURE 2 illustrates a device constructed in accordance with the basic concept of this invention.

Referring now to FIGURE 1 there is shown a portion of the punched paper tape employed with the device disclosed herein. The tape is shown generally at 100 and has upon it lines of data disposed across its width, that is, along lines of centers indicated as *a, b* and *c.* Along each of these lines of centers are placed the data holes required to represent a particular data character. The coding shown employs a five hole maximum code combination such as the Western Union telegraph code. It should be understood that when an actual code group is found on the tape it is not necessary that all five data hole positions be occupied, only as many holes will be present as are required to represent the particular character which is transmitted at the desired time. Further it should be recognized that the five hole code shown is merely for illustrative purposes and that the invention is equally applicable to codes requiring more or less holes or punches for each particular code group to represent a particular character. Also found along the lines of centers *a, b* and *c* is the hole indicated as a sprocket hole 102. In the tape shown the sprocket is found between the third and the fourth data hole positions. It should be understood however that this sprocket hole may be disposed anywhere along the line of centers as is convenient. As shown by the figure in the preferred embodiment the sprocket hole is much smaller in diameter than the diameter of the data holes. It should be understood that the sprocket holes may be made of the same diameter or that the diameters of the sprocket and data holes may be varied as desired. However it is particularly advantageous to have the sprocket hole smaller as shall later be described. Thus, in relation to the diameter of the sprocket hole 102 the data holes 104 have a portion of their areas which lie within the guide lines *d* and *e,* which designate the outermost extremes of the sprocket hole 102. Further, there is a portion of the respective data holes 104 which lie just before and after the zone *d–e.* The area of the data holes 104 which lie within the lines *d* and *e,* indicating the extent of the sprocket hole, are shown in the drawing. As will become evident, the diameter of the sprocket hole is intentionally made much smaller than the diameter of the data holes so that when the tension placed upon the tape as a result of being driven in a particular direction is released and the tape tends to sag (as stated above, in a direction opposite to the direction of movement) the possibility of slipping back from the gap region into the previous sprocket hole and thus causing the last data line to be re-read is eliminated. This is found to be true from the following specific instances: (1) In the event that the tape being driven to the left is caused to stop at the rightmost edge of a data hole, when the drive tension is removed the tape will slip so as to move the line of data holes just read to the right. However, within the tolerances of the braking system the tape will be completely halted before it has moved a distance equal to the distance between the rightmost edge of the sprocket hole and the rightmost edge of the data hole. Thus it will not be possible to get the required sprocket pulse after the gap signal and thus permit readout of the data line previously read to the memory; and (2) In the event the tape is stopped within a data hole and as the tension is released, the tape moves rightwardly until the read heads again sense the previously read sprocket. However, no re-reading is possible due to the absence of the gap signal which must occur before a sprocket pulse read may be considered valid as will be explained in detail below. In that the position of the tape at which the brake acts and the position at which it finally comes to rest, the same data holes are read, the required gap signal cannot be generated, thus preventing a read-out signal.

As will be set forth below, the sensing of a sprocket position is important to the accurate determination of the validity of the particular line of data to be read for any desired read operation. The distance between the edges of respective lines of data holes, notably that distance between the guide lines indicated as *f* and *g* in the figure is designated as the gap distance or simply as the gap.

The construction and manner of operation of the instant device will now be set forth, with reference to FIGURE 2. The tape 100 is moved in the direction indicated by the arrow by means not shown. The data and sprocket holes of the tape as it is moved are illuminated from above by a lamp 110. In those cases in which holes appear at the locations indicated by the data holes 104 or the sprocket hole 102 the beam of light from the lamp 110 is passed through the tape to a set of photocells indicated as 112, 113, 114, 115, 116 and 117. These photocells sense the various bits or data holes and sprocket holes contained on the tape 100. For example, photocell 112 will sense the fifth row data hole 104 and pass its output to a read amplifier 122 to make available an output signal designated as TRB5. In a similar manner the output of photocell 113 is passed to read amplified 123 and makes available signal TRB4. The outputs of the photocells 115, 116 and 117 are passed to read amplifiers 125, 126 and 127 and make available the signals TRB3, TRB2 and TRB1 respectively. The output of the photocell 114 is passed to a read amplifier 124 and makes available the sprocket pulse or signal. The output of the amplifier read 124 is also passed to additional gating units as will be described hereinafter. The outputs from the read amplifiers 122 through 127 are passed to an "Or" circuit 130 the output of which is made available on the line 132. An output on the line 132 indicates the absence of a gap condition and is thus designated as GAP with a bar over it $(\overline{\text{GAP}})$. The $\overline{\text{GAP}}$ signal on line 132 is passed through an inverting circuit 136 and made available on the line 138 as a gap signal. Briefly stated the operation is thus: if a signal is present on any of the data hole lines or upon the sprocket hole line a $\overline{\text{GAP}}$ signal having an arbitrary value of 1 will be available on the line 132 indicating that no gap exists at that particular reading time. Since a one value signal is available on the line 132 to indicate this condition, a zero value signal is made available by inverter 136 on the line 138 indicating that gap is not present at that particular time. However, if no signal is found to exist, that is, none of the photocells 112 through 117 is excited due to the presence of a data hole or sprocket hole under the lamp 110, zeros are applied to all the inputs of the "Or" circuit 130 with the result that a zero signal is passed to the $\overline{\text{GAP}}$ lines 132. The zero signal is applied by the line 132, to the inverter 136 which produces a one output on the line 138 indicating that a gap condition is present, which is true if no data holes or sprocket holes are being read at that time.

The output of read amplifier 122 is also passed along line 142 to a delay element 152 and in a similar manner the outputs of read amplifiers 123, 125, 126 and 127 are passed along the lines 143, 145, 146 and 147 to respective delay elements 153, 155, 156 and 157. The outputs of the delay elements 152, 153, 155, 156 and 157 are in turn introduced to one input of a group of five individual "And" circuits designated 162, 163, 165, 166 and 167 respectively. The second input to each of these "And" gates is provided by means of a signal introduced on the line 169, the generation of which will be set forth below. Hence, the outputs of the "And" circuits 162, 163, 165, 166 and 167 make available the individual elements of the code group which represent a particular line of data read from the tape.

The output of the read amplifier 124 is also passed via a line 128 to input 1 of a five input "And" circuit designated 170. The second, third and fourth input signals of the "And" circuit 170 are provided from the central control of the tape synchronizer (of which this circuit is a part) designated generally as 172. The first of these signals is the T busy signal which indicates that the instant tape synchronizer is being used to read the data from the tape 100, and cannot accept any further instructions from the central computer to perform any other operation. The second signal or T pinch signal, also provided by the central control, indicates that the pinch rollers are now in contact with the tape to provide for movement. The TWM signal, provided by the central control 172, indicates that a tape write to the memory, in other words, a tape reading operation is to be performed. These signals are generated and provided by the central control portion of the tape synchronizer in response to signals from the main computer indicating a tape reading operation is to be performed by a particular tape synchronizer. The manner of generation of the various main computer signals are not considered a part of this invention and are therefore not set forth in detail.

The fifth and final input to the "And" circuit 170 is provided by the output of an "Or" circuit 174. The output of the "And" circuit 170 is directed to the input of a 250 microsecond delay flop 178. The delay flop is in effect a monostable multi-vibrator which can exist in its non-stable condition for a duration of 250 microseconds before it returns to its stable condition. Thus, it is capable of producing an output on the line 180 for the duration of the 250 microseconds. The output of the delay flop on the line 180 is applied to the reset terminal of a flip-flop 182. The flip-flop 182 may be of conventional design and provides a signal on its 0 terminal when it exists in the reset condition. The 0 output line of the flip-flop 182 is connected to the 2 input terminal of a five input "And" gate 184. The output of the "And" circuit 184 is impressed upon the line 169 which provides the necessary gating signal for the "And" circuits 162, 163, 165, 166 and 167 as set forth above. The flip-flop 182 is placed in its set condition by a T terminate signal introduced to the "Or" circuit 186 whose output is connected to the set terminal of the flip-flop 182.

The output line 180 of delay flop 178 is further connected to the reset terminal of hold flip-flop designated as 188. The set input terminal of the flip-flop 188 is connected to the gap output line 138. The one output of the hold flip-flop 188 is connected to an output line 190 which provides one of the inputs to an "Or" circuit 174. The hold flip-flop 188 is of conventional design and provides a signal on the one output when the flip-flop is in the set condition. Further the output line 180 of the delay flop 178 is connected by means of a line 192 to input terminal 1 of the "Or" circuit 174, the output of which provides a signal on input 5 of the "And" circuit 170.

The T term or terminate signal is produced at the "1" or set output of the TERM flip-flop 206. The set input of flip-flop 206 is controlled by means of a pre-settable binary counter 194 in the following manner. A pre-set signal group is provided on the line 196 from the central control directing the number of lines of data which must be read from the tape at one operation. This number may be set directly into the pre-settable binary counter 194 which is caused to count descendingly and thus produce an output signal as the counter passes through zero or overflows. On the other hand the pre-set signals may be in the nature of a complement of the actual value desired so that the counter when counting in ascending order may produce an output when the counter exceeds its full count and overflows. Counters of both types are well known in the art and are thus not set forth in detail. The counting pulses which are applied to the pre-settable binary counter 194 are provided on the line 128 from the output of the sprocket pulse amplifier 124. Thus it is the sprocket pulses that are read from the tape 100 which provide the necessary pulses to cause the pre-settable binary counter 194 to either count up or count down through zero and produce overflow indications. The overflow condition of counter 194 produces a signal over the overflow line 198 to the set input of the terminate flip-flop 206. The one output produced when the terminate flip-flop 206 is in the set condition is fed over line 213 to "Or" circuit 186. The output of "Or" circuit 186 is applied to the set terminal of the flip-flop 182. The zero or $\overline{\text{T}}$ $\overline{\text{TERM}}$ output of flip-flop 206 is connected via line 204 to input 3 of "And" circuit 184.

The fourth or $\overline{\text{TBS}}$ input to the "And" circuit 184 is provided along line 200 by the central control 172. This signal designated $\overline{\text{TBS}}$ indicates that a back space operation is not to be performed. In other words a signal will be provided on this line any time the tape is being run in a normal forward direction for reading as in the following examples presented later. It should be recalled that input 1 to "And" circuit 184 is provided by the delay flop 178 over line 180, while the 0 output of flip-flop 182 supplies a signal to input 2 of circuit 184.

The fifth input to the "And" circuit 184 is provided along a line 202 also from the central control 172. This signal is a time pulse *tp*2 provided by the clock of the central control. The clock merely being a pulse generator of a desired repetition rate is provided to assure that the signal read out will occur at a desired time, rather than haphazardly as it might due to certain time variations in the tape unit. The first input to the "And" circuit 184 is provided by the output of the delay flop 178 along the line 180.

The input to terminal 1 of the "And" gate 184 is an inhibiting input which will prevent the gate from producing an output despite the presence of all of the normal actuating signals. The inhibiting signal is provided to ensure that the gate 184 may only produce one output pulse for each sprocket hole read. Thus, when a sprocket is read the output of the delay flop 178 prevents an output during the entire time the same sprocket hole is being read. When the output of the delay flop 178 falls off then "And" gate 184 provides its output signal. It also acts to prevent a data hole which is not in correct alignment with the sprocket hole due to skew, from producing a false signal. In this manner the "And" gate cannot put out a plurality of output signals from the same sprocket hole read.

The manner of operation of the device with reference to specific examples of tape positioning will now be discussed. Assume that the tape has been stopped in the gap position between the last line of information read (on a previous read operation) and the next line available and hence it is desired in the next operation to commence reading the next line of data. Upon receipt of the proper instruction and decoding of such instruction by the main computer, signals are sent to the tape synchronizer which will provide signals on the $\overline{\text{TBS}}$, the T busy, the T pinch and the TWM lines. In addition the number of lines to be transferred in the particular read operation to which the instruction pertains is pre-set into the pre-settable binary counter 194 over the line 196. These signals are also directed along line 208 to the terminate flip-flop 206 to reset it and thus cause it to produce the $\overline{\text{T}}$ $\overline{\text{TERM}}$ signal required by "And" gate 184. The tape begins to move in the read operation and no signal is provided by the photocells 112 to 117 due to the reading of the gap. This results in an absence of input signal to the "Or" circuit 130 which provides a zero output on the line 132. This zero output is conducted to the inverter 136 which provides a one output signal on the line 138 thus indicating that a gap condition exists. The gap condition sets the hold flip-flop 188 and thus provides an output signal on the line 190 to provide an input to the "Or" circuit 174. This in turn provides an input to the fifth input of the "And" circuit 170. This fifth input is thus made available to the gate 170 by the gate 174 for the full duration of the gap, that is from the time the last line of data has been read until the sprocket hole of the next line of data is read. Upon the first line of information to be read, reaching the read heads (that is the photocells 112 through 117) a sprocket hole will be sensed by the photocell 114 which will provide via amplifier 124 an input signal on the first input terminal of the "And" circuit 170 thus completing the necessary five inputs and causing the circuit 170 to apply an output to the delay flop 178. As stated above the delay flop 178 will maintain a signal at its output terminal for a period of 250 microseconds; in other words the time required for the passage of a sprocket hole over the respective photocells.

As a result of the output of the delay flop 178 applied to the 1 input or inhibit terminal of "And" circuit 184, the circuit 184 is prevented from producing an output during the time the sprocket hole is being read. In this manner the circuit can respond only once to each sprocket hole, and circuit 184 will only produce one output signal after the complete sprocket hole has been read. The output of the delay flop 178 is also applied to the line 180 to place flip-flop 182 in its reset condition thus applying its 0 output to terminal 2 of "And" circuit 184. This signal is ineffective to operate the "And" circuit 184 (providing the inputs to terminals 3 to 5 are also present) until the input to terminal 1 has ceased, as set out above. The output of delay flop 178 also causes the hold flip-flop 188 to be placed in its reset condition, thus removing the output signal from the one terminal of the flip-flop 188. As a result of the resetting of flip-flop 188 the input to terminal 2 of "Or" gate 174 is removed. The "Or" gate 174, however, continues to supply a signal to the input terminal 5 of "And" gate 170 due to the application of a signal to input terminal 1 of the gate from the output of delay flop 178. This input persists during the 250 $\mu$seconds the sprocket hole is being read. Thus "Or" gate 174 provides a signal on input 5 of "And" gate 170 during the sprocket read time and further during the gap read time. The "Or" gate does not supply a signal during the period from the end of the sprocket reading period until gap is read. Thus, only after gap has been detected and a sprocket read, in that order, could an output be produced from "And" gate 184 as will be set forth below. At the end of the period of 250 microseconds the inhibit signal is removed from the first input of the "And" circuit 184 thus permitting an output to be produced. A $\overline{\text{T}}$ $\overline{\text{TERM}}$ signal is available to the third input of the "And" circuit 184 on the line 204 from the reset or zero state of the terminate flip-flop 206, the terminating flop-flop having been set to its reset condition by means of the pre-setting signal applied to line 208 as set forth above. The $\overline{\text{TBS}}$ signal is available to the gate 184 as set forth above, due to the carrying out of a forward read tape operation. A last signal required, that is, the timing pulse t*p*2 is made available a short time after the signal ceases to appear on the inhibiting terminal of the "And" circuit 184. Thus upon the secession of the signal from delay flop 178, and the occurrence of time pulse 2, an output is available from the output terminal of the "And" circuit 184 and this output signal identified as the TSSHAB or valid sprocket on reading pulse tape. This TSSHAB signal thus indicates that a valid line of data has been read and may now be passed into the memory. The signal is applied to the line 169 which provides the second inputs to the "And" gates 162, 163, 164, 165, 166 and 167 thus permitting the signals to be passed from the temporary stores 152, 153, 155, 156 and 157 to the memory read-in lines TRB1 through TRB5. This signal will only be generated when the proper combination of inputs are present indicating that the line of data read is the line of data which should be read and passed to the memory. The TSSHAB signal is also applied via the line 210 to the second input of the "And" gate 212. This signal actuates the gate to pass the sprocket pulse which had been delayed in delay element 214 to the count input terminal of the presettable binary counter 194. Thus for each valid sprocket hole detected the counter is made to count one pulse. The delay 214 is proportioned so as to permit the sprocket pulse applied to its input to appear at its output after a determination is made as to whether or not the sprocket hole read is valid.

It should be noted that these pulses available on the output lines of the "And" circuits 162, 163, 165, 166 and 167 are available at a period of time after they have been sensed by the respective heads, 112 through 117. Hence if the tape had been stopped in a position within the gap between the last line of data read, as a portion of the last block of data, and the line of data which constitutes the first line of the succeeding block, the output of the photocells reading this line of data will be permitted to enter the main memory a short time period later. The succeeding alternate application of gap and sprocket pulses will cause a continuous generation of valid sprocket pulses by the gate 184 thus permitting the continued reading of the data holes into the main memory and the counting of the pre-settable binary counter. This operation continues until the pre-settable binary counter is caused to overflow, at which time an output is directed to the set terminal of the terminate flip-flop 206 which causes it to produce an output on the line 213 thereby applying a signal to the T term input of the "Or" circuit 186. The output of this "Or" circuit being directed to the set input of the flip-flop 182 thus removing the signal from the 0 output of the flip-flop. This in effect produces an inhibitory input to the terminal of the "And" circuit 184 thus preventing any further output from the "And" circuit 184. It should be recalled that hold flip-flop 188 is set by each gap position as it is detected. Thus for a final tape stop position wherein the tape comes to rest between the data holes of the last line of data and the start of the sprocket of the next line of data, the signals described above will be present and allow the data read to pass into the memory.

If upon the stopping the tape motion, the tape had come to rest with the sprocket hole over the photocells this line of data upon the next tape reading operation would not be re-read (and transferred to the memory). This is so due to the absence of the proper sequence of gap and sprocket holes. Thus even though the sprocket would be available to input 1 of "And" gate 170 and the signals T Busy, T Pinch and TWM are made available to terminals 2, 3 and 4 by the central control 172, there would be no signal present on input 5, and thus no output from "And" gate 170. The absence of a signal on input 5 is due to the fact that no gap signal has been generated by "Or" gate 130 (since one or more of the photocells is actuated due to the data or sprocket holes being stopped over them) to set the hold flip-flop 188, the flip-flop having been reset by the sprocket hole signal. In that the flip-flop 188 remains reset, no signal can be provided on the one output line 190 to "Or" gate 174 and thence to input 5 of "And" gate 170. Further, no input is available on input terminal 1 to "Or" gate 174 due to the off condition of delay flop 178. The effect of the sprocket hole when read as part of the last read operation would have terminated long before a new read operation could be started. Thus despite the re-reading of the sprocket hole of the last data line read no output can be produced because of the absence of an intermediate gap signal.

In the event that the tape comes to rest in the data hole area to the left of limit *d* of the last data line read the line of data will not be re-read during the next read operation. It should be remembered that the tape read operation is only stopped after the requisite number of data lines has been transferred from the tape to the memory. The counting of the number of lines transferred is accomplished by means of counting the sprocket holes. Thus the tape could never be actually stopped at this position because the associated sprocket would have to be read to complete the count. This condition could only result, therefore, from a stopping of the tape at the sprocket hole and a slipping back to the position to the left of the sprocket hole of limit *d*. As a result of the reading of the sprocket hole the hold flip-flop 188 would be reset, thus removing the signal to "Or" gate 174 and in turn input 5 to "And" gate 170. Thus when the tape is started up for the next read operation, the gap signal must occur to set flip-flop 188 so as to be responsive to the sprocket of the first data line in the next tape read operation.

The stopping of the tape in the data area to the right of limit *e* of the last data line read will not again be transferred to the memory on the next read operation due to the absence of a sprocket signal to input 1 of "And" gate 170. The next line of data will be read only upon the occurrence of the next sprocket, which will follow a gap condition. The operation of the invention under these conditions will be the same as that set forth above with respect to the tape stopping in the gap area.

In the event that the tape is stopped in the area of the data hole to the left of limit *d* of the first line of data to be read on the next data reading, this data will be available for read-out on the next read out operation. The data line would not have been read during the last read operation, however, due to the absence of the required sprocket signal. The read-out of this first line will be achieved as follows: As the tape starts to move the sprocket hole is read, thus providing an input on the 1 terminal of "And" gate 170. The normal control inputs are available from central control 172 to terminals 2 to 4 of gate 170. The signal to input 5 is provided by "Or" gate 174 as a result of the set condition of the hold flip-flop 188. It should be recalled that flip-flop 188 is reset by the sprocket pulse to actuate delay flop 178. Thus, since no sprocket pulse has been detected the hold flip-flop 188 remains in its set condition from the previous read operation. Thus, the reading of the sprocket will cause the transfer of the data read to the memory, as set forth above.

The condition wherein the tape is halted with the sprocket of the first data line to be read during the next tape read operation will still permit this data line to be read into the memory on the next succeeding read operation. As set forth above for the condition where the tape stops in the data hole area to the left of limit *d* on the first line of data to be read, the hold flip-flop 188 is left set from the previous read operation. Thus "And" gate 170 is permitted to pass the sprocket and permit the data line to be read to the memory. The sprocket hole when read during the stopping of the tape is ineffectual to reset the hold flip-flop 188 in that it is not permitted to pass through "And" gate 170. As a result of the previous read operation being completed, before the sprocket of the first data line of the next data group to be read arrives at the photoelectric readers the signals from the central control 172 are removed from terminals 2, 3 and 4 of "And" gate 170 thus preventing the passage of the sprocket pulse to reset flip-flop 188. Hence on the following read operation, flip-flop 188 remains set and permits the passage of the sprocket pulse so that the data corresponding to the sprocket may be read to the memory.

In the event that the tape comes to rest in the area to the right of limit *e* of the first data line to be read in the next read operation, this data line will not be read and its data lost. This is due to the fact that the hold flip-flop 188 was reset by the sprocket of that data line, thus removing input 5 from "And" gate 170. It is only in the event of this position of tape stoppage that the device cannot compensate for the sloppy braking of the tape transport and insure that the first line of data desired will be read on a subsequent read operation.

Thus there has been shown a device for accurately determining the validity of the first character to be read in a paper tape read operation. The device does not require the use of large areas of blank space between respective data blocks and does away with the requirement for addresses for respective data blocks. Further the device is able to utilize any length of desired data block. It will be understood that various omissions and substitutions and changes of the form and detail of the device illustrated and in its operation may be made by those skilled in the art, without departing from the spirit of the invention.

The embodiments of the invention in which an exclusive property or privilege is claimed are defined as follows:

1. In a record handling system wherein the data is arranged in discrete rows along the record media, each row comprising a plurality of data code positions and a sprocket position, said record media having indicia at said data code positions in accordance with the information contained in said row, a device for determining whether the first data row read during a current record reading operation is the first data row which should be read comprising:

first means to store an indication of the position in which the record media was stopped at the completion of the past record reading operation;

second means for sensing the indicia upon said record media; and utilization means;

a selectively operable link connecting said second means to said utilization means; and third means responsive to said first and second means for determining if the data row read is the correct first data row and for rendering said link operable.

2. In a tape handling system wherein the data is arranged in discrete rows along the tape, each row comprising a plurality of data code positions and a sprocket hole, said tape having holes punched at said data code positions in accordance with the information contained in said row, a device for determining whether the first data row read during a current tape read operation is the first data row which should be read comprising:

first means to store an indication of the position in which the tape was stopped at the completion of the past tape read operation;

second means for sensing the holes punched upon said tape;

utilization means;

a selectively operable link connecting said second means to said utilization means; and third means responsive to said first and second means for determining if the data row read is the correct first data row and for rendering said link operable.

3. In a tape handling system wherein the data is arranged in discrete rows along the tape, each row comprising a plurality of data code positions and a sprocket hole, said tape having holes punched at said data code positions in accordance with the information contained in said row, a device for determining whether the first data row read during a current tape read operation is the first data row which should be read comprising:

first means to store an indication of whether a data or sprocket hole or the gap between successive data rows was last read from said tape at the completion of the past tape read operation;

second means to sense the presence of data or sprocket holes or said gap at the start of the present tape read operation; and third means responsive to said first and second means for determining if the data row read at the start of said present read operation is the correct first data row.

4. In a tape handling system wherein the data is arranged in discrete rows along the tape, each row comprising a plurality of data code positions and a sprocket hole, said tape having holes punched at said data code positions in accordance with the information contained in said row, a device for determining whether the first data row read during a current tape read operation is the first data row which should be read comprising:

first means to store an indication of whether a data or sprocket hole or the gap between successive data rows was last read from said tape at the completion of the past tape read operation;

sensing means to sense the holes punched in said tape;

buffer storage means responsive to the output of said sensing means for receiving the data read from successive data rows;

storage means;

gating means arranged between said buffer storage means and said storage means to control the transfer of data therebetween;

second means also responsive to the output of said sensing means for determining the presence of data or sprocket holes or said gap at the start of the present tape read operation;

third means responsive to said first and second means for determining if the data row read at the start of said present read operation is the correct first data row and generating a signal when said data line is the correct first data row; and means for conducting said signal to said gating means to permit the transfer of data from said buffer storage means to said storage means.

5. A device as claimed in claim 4, which further includes a preset counter coupled to said third means, for counting each data row read during a data read operation and for preventing the generation of said signal when said counter reaches said preset value.

6. In a tape handling system wherein the data is arranged in discrete rows along the tape, each row comprising a plurality of data code positions and a sprocket hole, said tape having holes punched at said data code positions in accordance with the information contained in said row, a device for determining whether the first data row read during a current tape read operation is the first data row which should be read comprising:

first means to store an indication of whether a data or sprocket hole or the gap between successive data rows was last read from said tape at the completion of the past tape read operation;

second means to provide signals indicative of the sensing of a data or sprocket hole or said gap at the start of the present tape read operation, said signal indicative of said gap, placing said first means in a first condition to provide a gap signal;

third means responsive to said gap signal and the next succeeding sprocket hole to provide a further signal indicative that said data row read at the start of said present read operation is the correct first data row.

7. In a tape handling system wherein the data is arranged in discrete rows along the tape, each row comprising a plurality of data code positions and a sprocket hole, said tape having holes punched at said data code positions in accordance with the information contained in said row, a device for determining whether the first data row read during a current tape read operation is the first data row which should be read comprising:

first means to store an indication of whether a data or sprocket hole or the gap between successive data rows was last read from said tape at the completion of the past tape read operation;

sensing means to sense the holes punched in said tape;

buffer storage means for receiving the data read from successive data rows;

storage means;

gating means arranged between said buffer storage means and said storage means to control the transfer of data therebetween;

second means also responsive to the output of said sensing means for providing signals indicative of the sensing of a data or sprocket hole or said gap at the start of the present tape read operation, said signal indicative of said gap, placing said first means in a first condition to provide a gap signal;

third means responsive to said gap signal and the next succeeding sprocket hole to provide a further signal indicative that said data row read at the start of said present read operation is the correct first data row;

and means for conducting said further signal to said gating means to permit the transfer of data from said buffer storage means to said storage means.

8. A device as claimed in claim 7, which further includes a preset counter coupled to said third means, for counting each data row read during a data read operation and for preventing the generation of said further signal when said counter reaches said preset value.

9. In a record handling system wherein the data is arranged in discrete rows along the record media, each row comprising a plurality of data code positions and a sprocket position, said record media having indicia at said data code positions in accordance with the information contained in said row, the indicia at said data code positions having a greater physical length, along the media, than said corresponding sprocket indicia, a device for determining whether the first data row read during a current record reading operation is the first data row which should be read comprising:

first means to store an indication of the position in which the record media was stopped at the completion of the past record reading operation;

second means for sensing the portion of said data row where said data indicia and said sprocket indicia are both present;

utilization means;

a selectively operable link connecting said second means to said utilization means;

and third means responsive to said first and second means for determining if the data row read is the correct first data row and for rendering said link operable.

10. In a tape handling system wherein the data is arranged in discrete rows along the tape, each row comprising a plurality of data code positions and a sprocket hole, said tape being punched at said data code positions in accordance with the information contained in said row, said data holes located on the same center line as said sprocket hole and being of greater diameter than said sprocket hole, a device for determining whether the first data row read during a current tape reading operation is the first data row which should be read comprising:

flip-flop means to store an indication of whether a data or sprocket hole or the gap between successive data rows was last read from said tape at the completion of the past tape read operation;

photocell sensing means to sense the holes punched in said tape;

buffer storage means for receiving the data read from successive data rows;

storage means;

a plurality of "And" gates arranged between said buffer storage means and said storage means to control the transfer of data therebetween;

second means comprising, an "Or" gate and an inverter, also responsive to the output of said sensing means for providing signals indicative of the sensing of a data or sprocket hole or said gap at the start of the present tape read operation;

said signal indicative of said gap, placing said flip-flop means in a first condition to provide a gap signal;

second flip-flop means responsive to said gap signal and the next succeeding sprocket hole to provide a further signal indicative that said data row read at the start of said present read operation is the correct first data row; and connecting means to conduct said last named signal to said "And" gates to permit the transfer of data from said buffer storage means to said storage means.

11. In a tape handling system wherein the data is arranged in discrete rows along the tape, each row comprising a plurality of data code positions and a sprocket hole, said tape being punched at said data code positions in accordance with the information contained in said row, said data holes located on the same center line as said sprocket hole and being of greater diameter than said sprocket hole, a device for determining whether the first data row read during a current tape reading operation is the first data row which should be read, regardless of the position the tape comes to rest at the completion of the past tape read operation comprising:

a plurality of sensing means for sensing said data and sprocket holes punched in said tape;

first means to store an indication of whether a data or sprocket hole or the gap between successive data rows was last read from said tape at the completion of said past tape read operation;

second means responsive to said sensing means to produce a first signal indicative of the sensing of said sprocket or data holes and to produce a second signal indicative of the sensing of said gap;

said gap signal only occurring after all of said sensing devices no longer sense holes within a data row;

means connecting said second signal of said second means to said first means to set said first means in a first condition to produce a gap signal;

third means connected to said first means and said sensing means and operative upon the receipt of a gap signal followed by a sprocket hole signal from said sensing means to produce an output signal indicative that said first data row read is correct.

12. In a tape handling system wherein the data is arranged in discrete rows along the tape, each row comprising a plurality of data code positions and a sprocket hole, said tape being punched at said data code positions in accordance with the information contained in said row, said data holes located on the same center line as said sprocket hole and being of greater diameter than said sprocket hole, a device for determining whether the first data row read during a current tape reading operation is the first data row which should be read, regardless of the position the tape comes to rest at the completion of the past tape read operation or the movement of the tape at the start of the current tape reading operation comprising:

a plurality of sensing means for sensing said data and sprocket holes punched in said tape;

first means responsive to all said sensing means to produce a gap signal only when all said sensing means no longer sense holes along the same data row;

second means responsive to the application of said gap signal and the next succeeding sprocket hole to produce a signal indicative that said first data row is the correct data row to be read, said second means including apparatus for preventing said second means from operating after the incorrect sequence of sprocket and gap signals in the event incorrect tape motion occurs at the start of the current tape read operation.

13. In a tape handling system wherein the data is arranged in discrete rows along the tape, each row comprising a plurality of data code positions and a sprocket hole, said tape being punched at said data code positions in accordance with the information contained in said row, said data holes located on the same center line as said sprocket hole and being of greater diameter than said sprocket hole, a device for determining whether the first data row read during a current tape reading operation is the first data row which should be read, regardless of the position the tape comes to rest at the completion of the past tape read operation or the movement of the tape at the start of the current tape reading operation comprising:

first means to store an indication of whether a data or sprocket hole or the gap between successive data rows was last read from said tape at the completion of said past tape read operation;

a plurality of sensing means for sensing said data and sprocket holes punched in said tape;

second means responsive to all said sensing means to provide a gap signal only when all said sensing means no longer sense holes along the same data row;

connecting means for conducting said gap signal from said second means to said first means thereby causing said first means to produce an enabling signal;

third means responsive to said enabling signal and the next succeeding sprocket hole to produce a signal indicative that said first data row is the correct data row to be read, said third means being inoperative to produce said signal indicative of a correct data row when said enable signal is absent as a result of the sensing of a date or sprocket hole, said third means also being inoperative to produce said signal indicative of a correct data row when said sequence of sprocket and enable signals is incorrect due to the undesired movement of said tape at the start of the current tape read operation.

14. In a tape handling system wherein the data is arranged in discrete rows along the tape, each row comprising a plurality of data code positions and a sprocket hole, said tape being punched at said data code positions in accordance with the information contained in said row, said data holes located on the same center line as said sprocket hole and being of greater diameter than said sprocket hole, a device for determining whether the first data row read during a current tape reading operation is the first data row which should be read, regardless of the position the tape comes to rest at the completion of the past tape read operation or the movement of the tape at the start of the current tape reading operation comprising:

first means to store an indication of whether a data or sprocket hole or the gap between successive data rows was last read from said tape at the completion of said past tape read operation;

a plurality of sensing means for sensing said data and sprocket holes punched in said tape;

buffer storage means for receiving the data read from successive data rows;

storage means;

gating means arranged between said buffer storage means and said storage means to control the transfer of data therebetween;

second means responsive to all said sensing means to provide a gap signal only when all said sensing means no longer sense holes along the same data row;

first connecting means for conducting said gap signal from said second means to said first means thereby causing said first means to produce an enabling signal;

third means responsive to said enabling signal and the next succeeding sprocket hole to produce a signal indicative that said first data row is the correct data row to be read, said third means being inoperative to produce said signal indicative of a correct data row when said enable signal is absent as a result of the sensing of a data or sprocket hole;

second connecting means, connecting said third means to said gating means for conducting said signal to said gating means to permit the transfer of data from said buffer storage means to said storage means.

15. In a tape handling system wherein the data is arranged in discrete rows along the tape, each row comprising a plurality of data code positions and a sprocket hole, said tape being punched at said data code positions in accordance with the information contained in said row, said data holes located on the same center line as said sprocket hole and being of greater diameter than said sprocket hole, a device for determining whether the first data row read during a current tape reading operation is the first data row which should be read, regardless of the position the tape comes to rest at the completion of the past tape read operation or the movement of the tape at the start of the current tape reading operation comprising:

flip-flop means to store an indication of whether a data or sprocket hole or the gap between successive data rows was last read from said tape at the completion of said past tape read operation;

a plurality of photocell sensing means for sensing said data and sprocket holes punched in said tape;

second means comprising an "Or" gate and an inverter, responsive to all said photocell sensing means to provide a gap signal only when all said photocell sensing means no longer sense holes along the same data row;

buffer storage means for receiving the data read from successive data rows;

storage means;

first "And" gates arranged between said buffer storage means and said storage means to control the transfer of data therebetween;

first connecting means for conducting said gap signal from said second means to said flip-flop means thereby causing said flip-flop means to produce an enabling signal;

a further "And" gate responsive to said enabling signal and the next succeeding sprocket hole to produce a signal indicative that said first data row is the correct data row to be read, said further "And" gate being inoperative to produce said signal indicative of a correct data row when said enable signal is absent as a result of the sensing of a data or sprocket hole;

second connecting means, connecting said further "And" gate to said first "And" gates for conducting said signal to said first "And" gates to permit the transfer of data from said buffer storage means to said storage means.

16. In a record handling system wherein the data is arranged in discrete rows along the record media, each row comprising a plurality of data code positions and a sprocket position, said record media having indicia at said data code positions in accordance with the information contained in said row, the indicia at said data code positions having a greater physical length, along the media, than said corresponding sprocket indicia, a device for determining whether the first data row read during a current record reading operation is the first data row which should be read, regardless of the position that the record media comes to rest at the completion of the past record read operation or the movement of the record media at the start of the current record reading operation comprising:

a plurality of sensing means for sensing said data and sprocket indicia upon said record media;

first means responsive to all said sensing means to produce a gap signal only when all said sensing means no longer sense indicia along the same data row;

second means responsive to the application of said gap signal and the next succeeding sprocket indicia to produce a signal indicative that said first data row is the correct data row to be read, said second means including apparatus for preventing said second means from operating after the incorrect sequence of sprocket and gap signals in the event incorrect record indicia motion occurs at the start of the current record reading operation.

17. In a record handling system wherein the data is arranged in discrete rows along the record media, each row comprising a plurality of data code positions and a sprocket position, said record media having indicia at said data code positions in accordance with the information contained in said row, the indicia at said data code positions having a greater physical length, along the media, than said corresponding sprocket indicia, a device for determining whether the first data row read during a current record reading operation is the first data row which should be read, regardless of the position that the record media comes to rest at the completion of the past record read operation or the movement of the record media at the start of the current record reading operation comprising:

first means to store an indication of whether data or sprocket indicia or the gap between successive data rows was last read from said record media at the completion of said past record reading operation;

a plurality of sensing means for sensing said data and sprocket indicia upon said record media;

buffer storage means for receiving the data read from successive data rows;

storage means;

gating means arranged between said buffer storage means and said storage means to control the transfer of data therebetween;

second means responsive to all said sensing means to provide a gap signal only when all said sensing means no longer sense indicia along the same data row;

first connecting means for conducting said gap signal from said second means to said first means thereby causing said first means to produce an enabling signal;

third means responsive to said enabling signal and the next succeeding sprocket indicia to produce a signal indicative that said first data row is the correct data row to be read, said third means being inoperative to produce said signal indicative of a correct data row when said enable signal is absent as a result of the reading of data or sprocket indicia;

second connecting means, conecting said third means to said gating means for conducting said signal to said gating means to permit the transfer of data from said buffer storage means to said storage means.

References Cited

UNITED STATES PATENTS

| | | | |
|---|---|---|---|
| 3,049,291 | 8/1962 | Greenhalgh et al. | 340—172.5 X |
| 3,141,151 | 7/1964 | Gilson | 340—172.5 |
| 3,222,501 | 12/1965 | Wood | 235—61.7 |

ROBERT C. BAILEY, *Primary Examiner.*

P. J. HENON, *Assistant Examiner.*